(12) United States Patent
Bacon et al.

(10) Patent No.: US 9,742,556 B2
(45) Date of Patent: Aug. 22, 2017

(54) COMPARISON AND SEARCH OPERATIONS OF ENCRYPTED DATA

(71) Applicant: International Business Machines Corporation, Armonk, NY (US)

(72) Inventors: David F. Bacon, Sleepy Hollow, NY (US); Graham A. Bent, Hursley (GB); Flavio A. Bergamaschi, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 14/834,485

(22) Filed: Aug. 25, 2015

(65) Prior Publication Data
US 2017/0063525 A1  Mar. 2, 2017

(51) Int. Cl.
*H04L 29/06* (2006.01)
*H04L 9/00* (2006.01)
*G06F 12/14* (2006.01)
*H04K 1/00* (2006.01)

(52) U.S. Cl.
CPC .................................. *H04L 9/008* (2013.01)

(58) Field of Classification Search
None
See application file for complete search history.

(56) References Cited

U.S. PATENT DOCUMENTS

| 5,495,532 | A | 2/1996 | Kilian et al. | |
|---|---|---|---|---|
| 8,565,435 | B2 | 10/2013 | Gentry et al. | |
| 2011/0110525 | A1 | 5/2011 | Gentry | |
| 2012/0039473 | A1 | 2/2012 | Gentry et al. | |
| 2012/0066510 | A1 | 3/2012 | Weinman | |
| 2013/0111205 | A1 | 5/2013 | Biswas | |
| 2013/0170640 | A1* | 7/2013 | Gentry | H04L 9/28 380/30 |
| 2013/0173917 | A1* | 7/2013 | Clifton | G06F 21/6227 713/167 |
| 2013/0329883 | A1* | 12/2013 | Tamayo-Rios | H04L 9/008 380/28 |
| 2014/0233727 | A1* | 8/2014 | Rohloff | G06F 17/3069 380/28 |
| 2015/0006908 | A1 | 1/2015 | Mori et al. | |
| 2015/0365239 | A1* | 12/2015 | Gajek | H04L 9/008 380/282 |
| 2017/0063526 | A1* | 3/2017 | Kahrobaei | H04L 9/008 |

OTHER PUBLICATIONS

Joseph et al., "Efficient Search on Encrypted Data", © 2005 IEEE, pp. 352-357.
Launchbury et al., "Efficient Lookup-Table Protocol in Secure Multiparty Computation", ICFP' 12, Sep. 9-15, 2012, Copenhagen, Denmark, Copyright © 2012 ACM 978-1-4503-1054—Mar. 12, 2009, pp. 1-12.

* cited by examiner

Primary Examiner — Eric Chen
(74) Attorney, Agent, or Firm — Lance I. Hochhauser (57) ABSTRACT

Searching for desired data within an encrypted set of data (using a fully homomorphic encryption) without decrypting the set of data. A lookup key is compared against a set of encrypted data, employing characteristics of the fully homomorphic encryption, to locate and return desired data correlated to the lookup key.

20 Claims, 8 Drawing Sheets

COMPARISON AND SEARCH OPERATIONS OF ENCRYPTED DATA

STATEMENT REGARDING FEDERALLY SPONSORED WORK

This invention was made with United States Government support under contract number W911NF-06-3-0001 awarded by the United States Army. The United States government has certain rights to this invention.

This invention was made with United Kingdom Government support under contract number W911NF-06-3-0001 awarded by the Ministry of Defense.

BACKGROUND

The present invention relates generally to the field of data processing management, and more particularly to usage protection of data files.

The ability to protect data while also being able to access that data from remote locations is of growing importance. However, the security of the data cannot be compromised or balanced with the ability to access. In addition, fully homomorphic encryption schemes that enable computations on ciphertext have been developed.

SUMMARY

According to an aspect of the present invention, there is a method, computer program product, and/or system that performs the following operations (not necessarily in the following order): (i) receiving a lookup key; (ii) comparing the lookup key to a first subset of a set of encrypted data using a bitwise equality to create a first result; (iii) performing a multiplication operation on the first result, as a first factor, and a second subset of the set of encrypted data, as a second factor, to create a lookup product; and (iv) creating a second result by combining the lookup product into a consolidated format. The lookup key, the set of encrypted data, the first result, the lookup product, and the second result are encrypted using a fully homomorphic encryption. The operation of comparing the lookup key to a first subset of a set of encrypted data using a bitwise equality to create a first result is performed by software operating on computer hardware.

DETAILED DESCRIPTION

Searching for desired data within an encrypted set of data (using a fully homomorphic encryption) without decrypting the set of data. A lookup key is compared against a set of encrypted data, employing characteristics of the fully homomorphic encryption, to locate and return desired data correlated to the lookup key. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
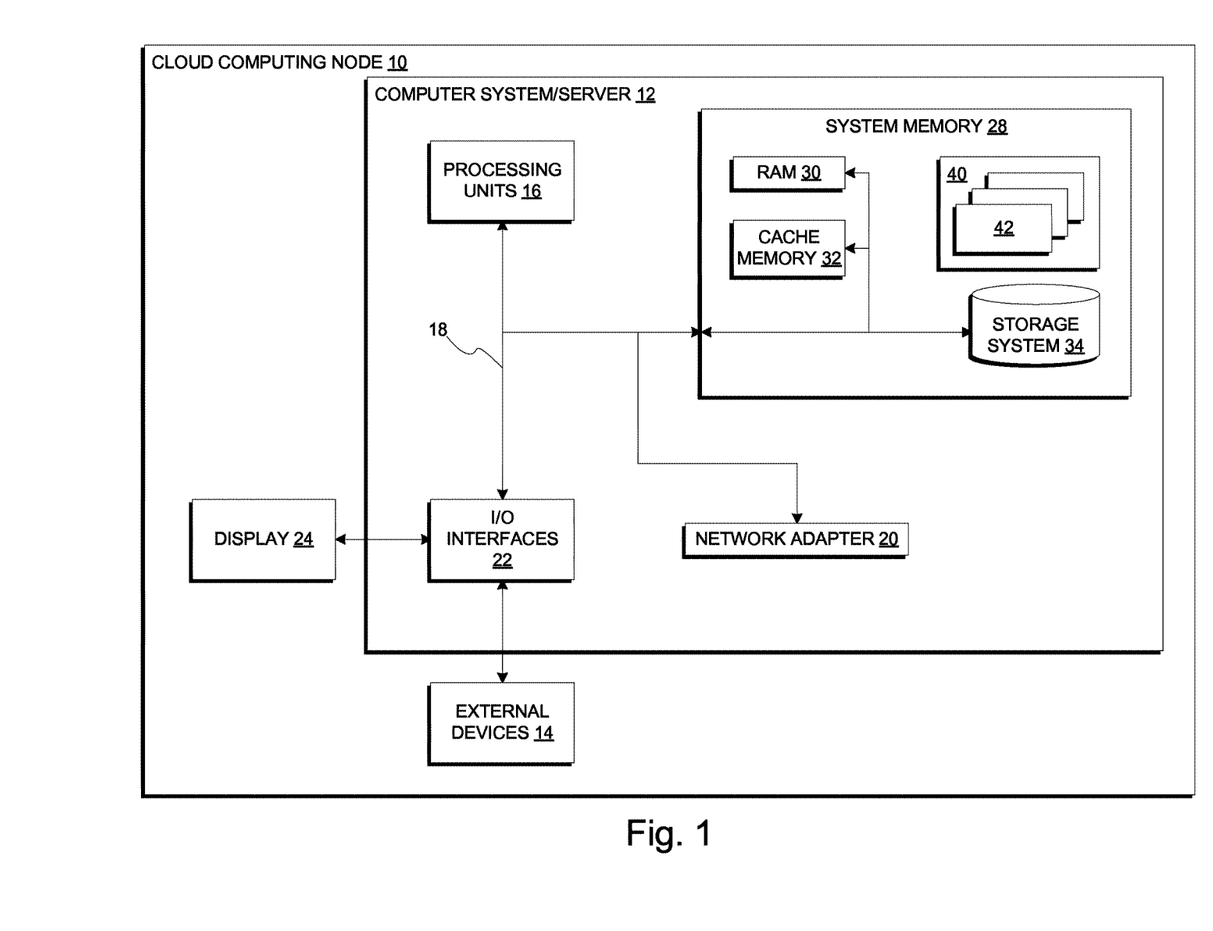
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having set of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Set of program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
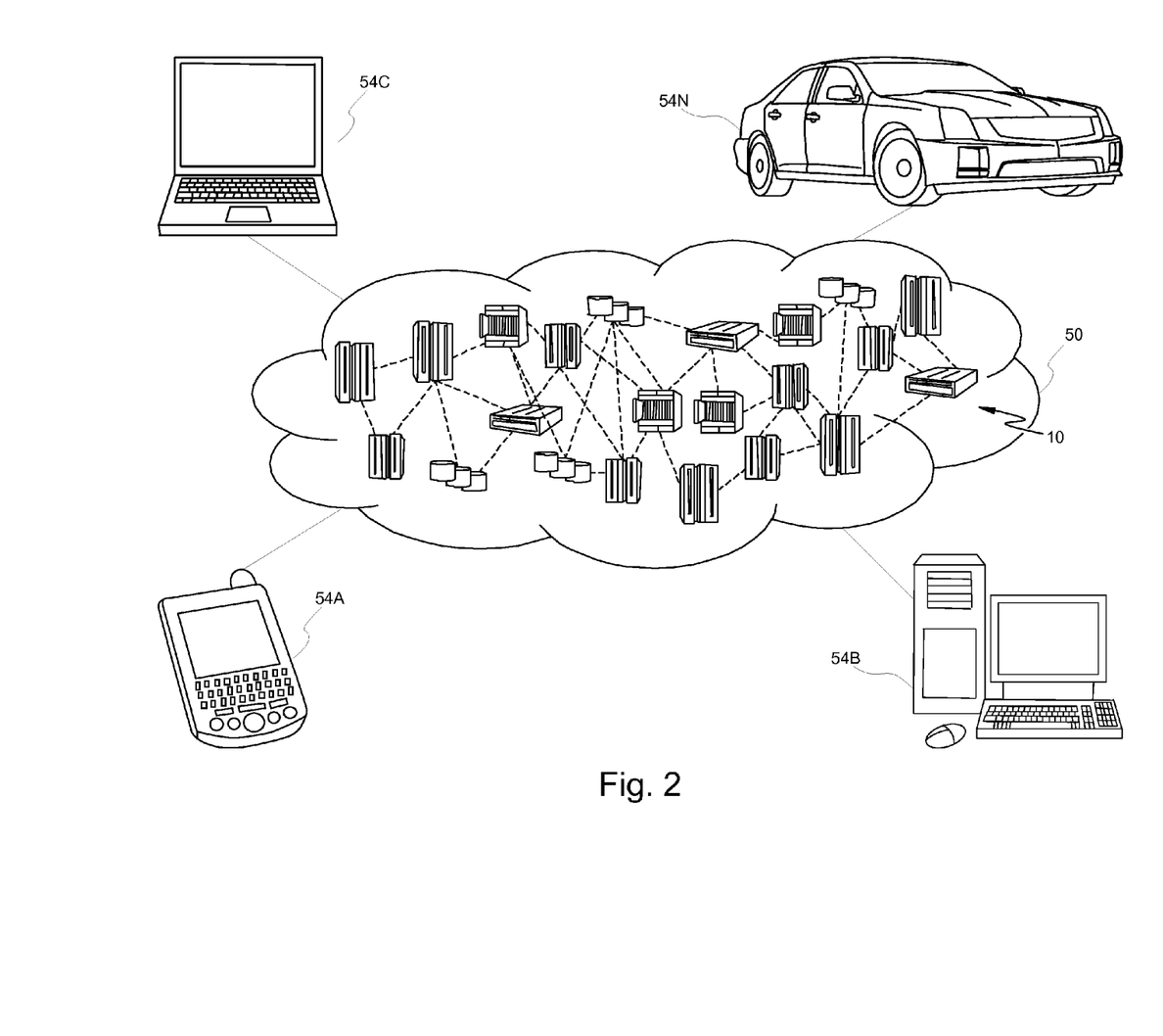
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes (e.g., cloud computing node 10) with which local computing devices used by cloud consumers, such as, for example, personal digital assistant (PDA) or cellular telephone 54A, desktop computer 54B, laptop computer 54C, and/or automobile computer system 54N may communicate. Cloud computing nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing node 10 and cloud computing environment 50 can communicate with any type of computerized device over any type of network and/or network addressable connection (e.g., using a web browser).

Figure 3:
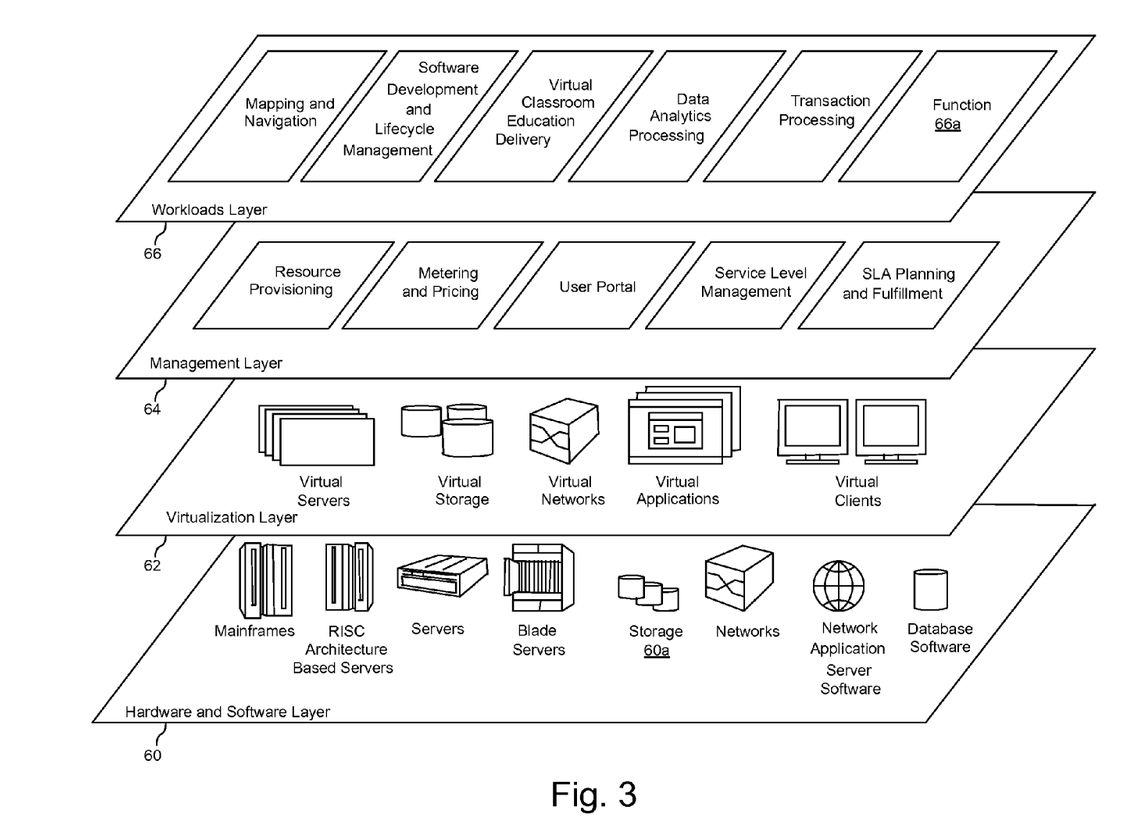
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
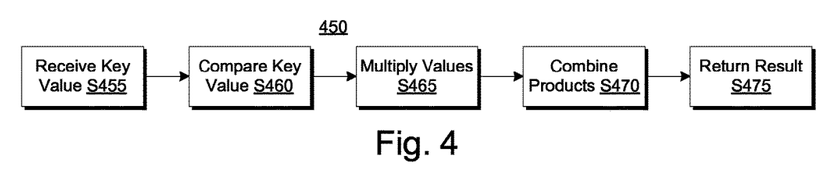
FIG. 4 is a flowchart showing a first embodiment method performed, at least in part, by the first embodiment system.
Figure 5:
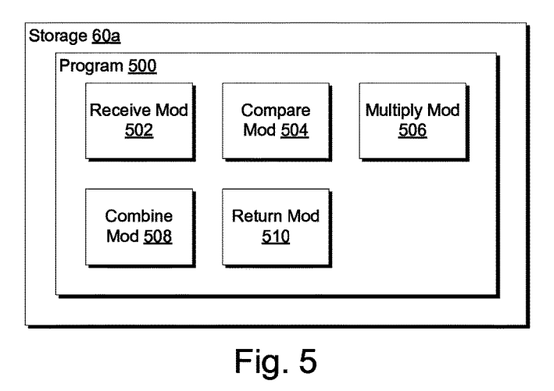
FIG. 5 is a block diagram view of a machine logic (for example, software) portion of the first embodiment system.

FIG. 4 shows flowchart 450 depicting a method according to the present invention. FIG. 5 shows program 500 which performs at least some of the method operations of flowchart 450. This method and associated software will now be discussed, over the course of the following paragraphs, with extensive reference to FIG. 4 (for the method operation blocks) and FIG. 5 (for the software blocks). One physical location where program 500 of FIG. 5 may be stored is in storage block 60a (see FIG. 3).

In this example, a user, John, has stored an encrypted list containing contacts and corresponding phone numbers (see data environment 600a in FIG. 6A) on computer system/server 12, a cloud computing node. In data environment 600a, information is stored as a set of individual bits (each bit represented by a character within a square). Additionally, an encryption is represented by a circle surrounding a bit; here, the encryption is a fully homomorphic encryption. The list of contacts are represented by set of contacts 602a; the corresponding phone numbers are represented by set of phone numbers 604a. For example, in data environment 600a, the first contact in set of contacts 602a is A-M-Y, and the first phone number in set of phone numbers 604a is 5-5-5-1-2-3-4; or the phone number for "Amy" is "555-1234." John desires remote access to data environment 600a but does not want anyone or anything else to access the contents of data environment 600a. Because data environment 600a is encrypted, computer system/server 12 does not have a way to determine the contents of the stored data or anything about data environment 600a.

Processing begins at operation S455, where receive module ("mod") 502 receives a lookup key. In this example, computer system/server 12 receives, from John, a lookup key (also sometimes called a reference value) encrypted using a fully homomorphic encryption. The lookup key is represented by lookup key 706a (FIG. 7A). John does not want to give information to computer system/server 12 about the contents of data environment 600a; therefore, John encrypts lookup key 706a before transmitting it to computer system/server 12. Alternatively, computer system/server 12 receives an unencrypted lookup key and encrypts the lookup key based on other information, including, but not limited to: (i) an encryption method; (ii) a public key; and/or (iii) a name of a user. In some embodiments of the present invention, computer system/server 12 receives an unencrypted lookup key and a public encryption key (i.e., a key used to encrypt data).

Processing proceeds to operation S460, where compare mod 504 compares the lookup key to a set of encrypted data. In this example, computer system/server 12 performs a bitwise equality to compare lookup key 706a (FIG. 7A) to set of contacts 602a. If a bit in lookup key 706a matches a corresponding bit in set of contacts 602a, an encrypted bitwise equality value of "1" is created; if a bit in lookup key 706a does not match a corresponding bit in set of contacts 602a, an encrypted bitwise equality value of "0" is created. Computer system/server 12 is unaware of the result of a comparison between lookup key 706a and set of contacts 602a; the intermediate lookup result value, represented by intermediate lookup result value 708a, is also encrypted. A comparison in this manner is possible due to the nature of a fully homomorphic encryption, which allows for manipulation of the ciphertext as if it were plaintext without decrypting the ciphertext. Here, lookup key 706a is the name "Fay." When computer system/server 12 compares lookup key 706a to set of contacts 602a, the outcome is intermediate lookup result value 708a. Here, the row of intermediate lookup result value 708a corresponding to "Fay" is 1-1-1, indicating that the bits of lookup key 706a matched the bits of that row of set of contacts 602a. The rows of intermediate lookup result value 708a corresponding to "Amy" and "Bob" have different results, 0-0-1 and 0-0-0 respectively. However, as noted above, computer system/server 12 is unaware of these results. Computer system/server 12 then creates lookup result 710a (sometimes called a first result) by applying a multiplication operation (in this case, a binary tree structure) to intermediate lookup result value 708a. Only the last value of lookup result 710a is non-zero, corresponding to "Fay" from set of contacts 602a.

Figure 7A:
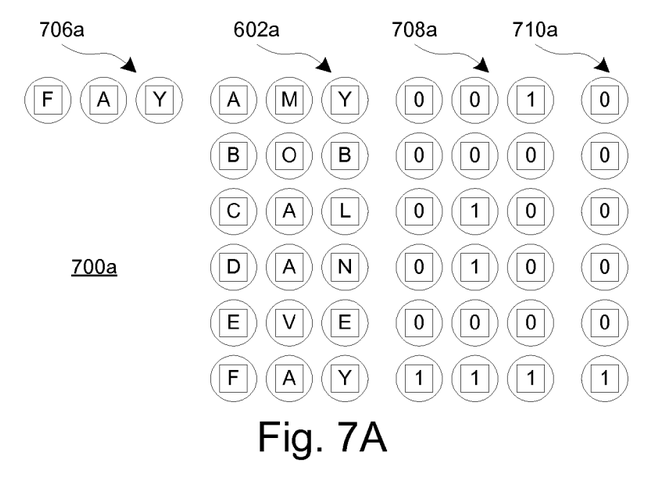
FIG. 7A depicts an embodiment of a lookup result environment according to the present invention.
Figure 8A:
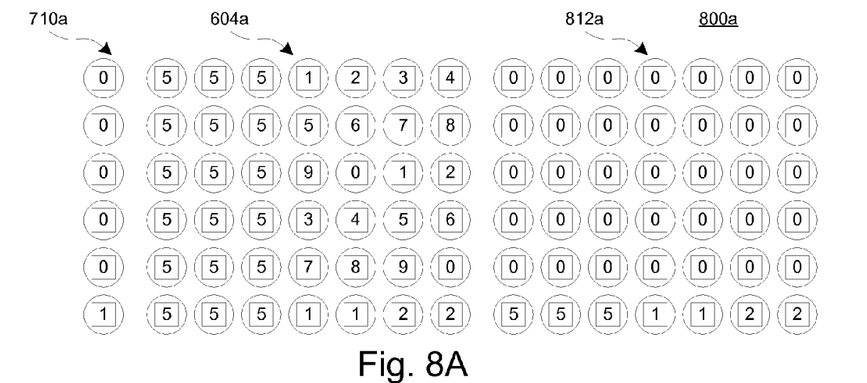
FIG. 8A depicts an embodiment of a lookup product environment according to the present invention.

Processing proceeds to operation S465, where multiply mod 506 multiplies the lookup result by a subset of the set of encrypted data. In this example, computer system/server 12 performs a multiplication operation (in this case, a binary tree structure) using set of phone numbers 604a and lookup result 710a, resulting in lookup product 812a (FIG. 8A). Here, as only one value of lookup result 710a is non-zero, only the corresponding row of lookup product 812a is non-zero. The phone number in data environment 600a corresponding to "Fay" is 555-1122. Here, the non-zero row of lookup product 812a is 5-5-5-1-1-2-2, or the phone number "555-1122." In some embodiments of the present invention, computer system/server 12 omits operation S465. In some embodiments of the present invention, computer system/server 12 combines operation S465 into the processing of operation S460.

Figure 9A:
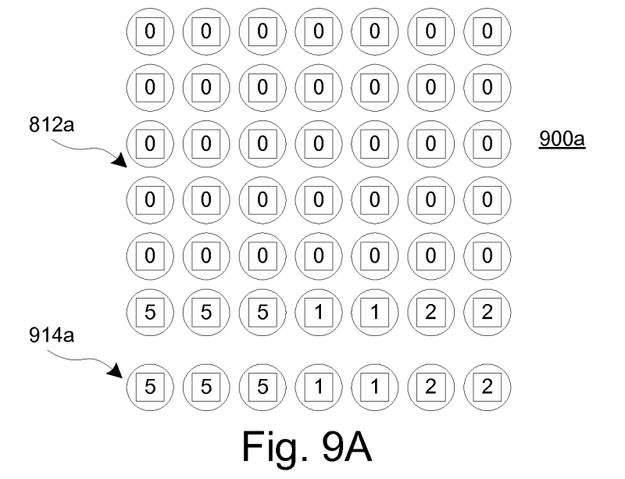
FIG. 9A depicts an embodiment of a final result environment according to the present invention.

Processing proceeds to operation S470, where combine mod 508 combines the lookup product into the format of the final result (sometimes called a second result). In this example, computer system/server 12 performs an addition operation on lookup product 812a to create final result 914a (FIG. 9A). Here, as only one row of lookup product 812a is non-zero, final result 914a contains only the values of the non-zero row of lookup product 812a. In some embodiments of the present invention, computer system/server omits operation S470.

Processing terminates at operation S475, where return mod 510 returns the final result. In this example, computer system/server 12 returns final result 914a, containing the phone number 555-1122, to John, who then calls Fay. During this process, none of set of contacts 602a, set of phone numbers 604a, lookup key 706a, final result 914a, nor any intermediate value was decrypted or exposed to computer system/server 12.

III. Further Comments and/or Embodiments

Some embodiments of the present invention recognize the following facts, potential problems, and/or potential areas for improvement with respect to the current state of the art: (i) fully homomorphic encryptions employing polynomial function encryption include noise; (ii) individuals desire secure, remote storage of data without granting the storing party access to the data; and (iii) if results from a system vary in format, a storing party has an ability to determine the contents of a stored set of data.

Figure 6A:
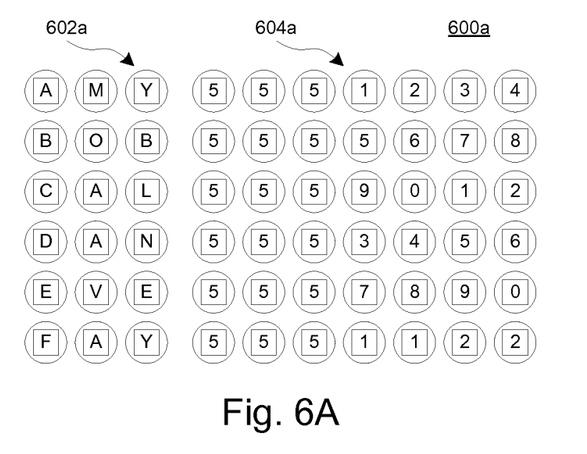
FIG. 6A depicts an embodiment of a data environment according to the present invention.

FIG. 6A is a block diagram illustrating various portions of data environment 600a, including: set of contacts 602a; and set of phone numbers 604a. (Throughout these examples, items initially appearing in one Figure and repeated in a later Figure will retain the numbering from the initial Figure.) Data environment 600a contains sixty individual bits of data (each bit represented by a character within a square). In data environment 600a (for ease of understanding), each individual piece of data displays the character (i.e., a letter or a number) represented by the piece of data. In some embodiments of the present invention, a subset of data environment 600a is a binary representation of data. The circle surrounding each individual bit of data is a separate encryption. In some embodiments of the present invention, the encryption is a fully homomorphic encryption. In some embodiments of the present invention, the encryption is a polynomial function encryption.

In some embodiments of the present invention, a portion of data environment 600a correlates to or refers to a separate portion of data environment 600a. In this example, each entry in set of contacts 602a correlates to an entry in set of phone numbers 604a. In some embodiments of the present invention, various entries in set of contacts 602a have varying lengths. In some embodiments of the present invention, various entries in set of phone numbers 604a have varying lengths. In some embodiments of the present invention, set of contacts 602a and set of phone numbers 604a represent general sets of correlated data (and not names of contacts and/or phone numbers). In this example, a row in set of contacts 602a correlates to the neighboring row in set of phone numbers 604a. Set of contacts 602a is generally any first subset of a set of data against which a computer system/server can compare lookup key 706a (FIG. 7A). The label "set of contacts" is used only for ease of reference and is not intended to create any limitation on the type of data that block 602a represents. Similarly, set of phone numbers 604a is generally any second subset of a set of data that correlates to, is correlated to by, references, is referenced by, corresponds to, and/or is corresponded to by a first subset of a set of data. The label "set of phone numbers" is used only for ease of reference and is not intended to create any limitation on the type of data that block 604a represents.

In some embodiments of the present invention, a computer system/server only operates on or observes encrypted, encoded, and/or enciphered data. In some embodiments of the present invention, a fully homomorphic encryption is an asymmetric encryption. Alternatively, a fully homomorphic encryption is a symmetric encryption. In some embodiments of the present invention, a fully homomorphic encryption is a polynomial function encryption.

In some embodiments of the present invention, a set of encrypted data is a database of information. In some embodiments of the present invention, a set of encrypted data is stored in a spreadsheet format. In some embodiments of the present invention, a first subset of a set of encrypted data contains a set of pointers to a second subset of the set of encrypted data. In some embodiments of the present invention, a first subset of a set of encrypted data is a set of headers.

Figure 6B:
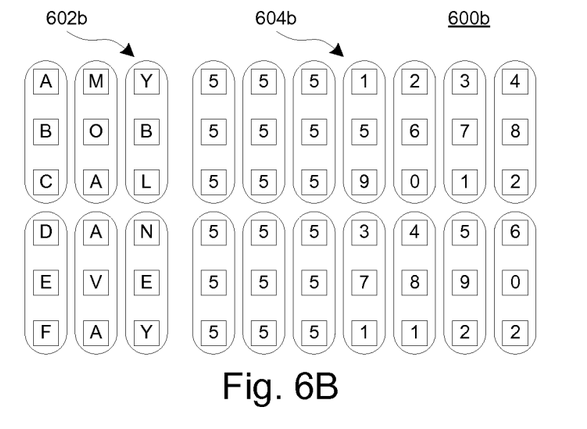
FIG. 6B depicts a first embodiment of a batch data environment according to the present invention.
Figure 7B:
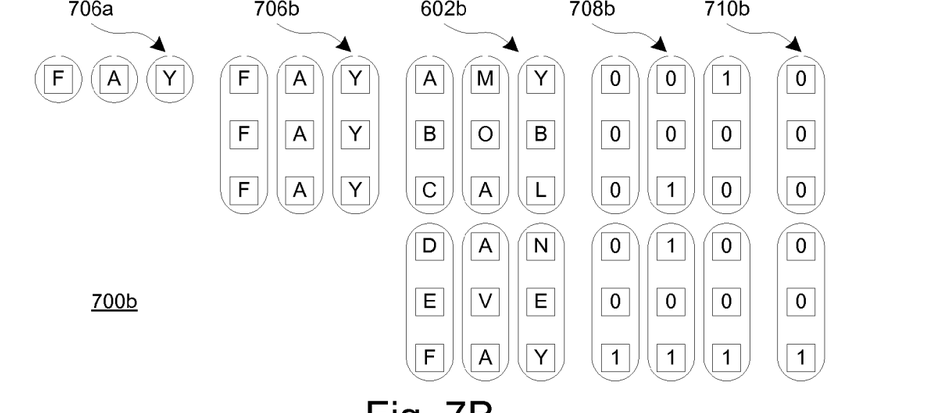
FIG. 7B depicts an embodiment of a batch lookup result environment according to the present invention.

FIG. 6B is a block diagram illustrating various portions of batch data environment 600b, including: set of batch contacts 602b; and set of batch phone numbers 604b. Batch data environment 600b contains the same sixty individual bits of data as are contained by data environment 600a. However, the sixty individual bits of data are not individually encrypted. In batch data environment 600b, encryptions are represented by elongated ovals (instead of circles). Here, the encryptions "batch" multiple bits of data into a single encryption; the first bits of data for the first three entries of set of batch contacts 602b are batched in a single encryption. Set of batch contacts 602b is generally any first subset of a set of data against which a computer system/server can compare batch lookup key 706b (FIG. 7B). The label "set of contacts" is used only for ease of reference and is not intended to create any limitation on the type of data that block 602b represents. Similarly, set of batch phone numbers 604b is generally any second subset of a set of data that correlates to, is correlated to by, references, is referenced by, corresponds to, and/or is corresponded to by a first subset of a set of data. The label "set of phone numbers" is used only for ease of reference and is not intended to create any limitation on the type of data that block 604b represents.

In some embodiments of the present invention, a computer system/server uses batch processing to improve efficiency. In some embodiments of the present invention, an encrypted batch is a combination of a plurality of data values into a single encryption. In some embodiments of the present invention, a set of batch encrypted data is a set of data in which data comprising the set of data is encrypted in a batch format. In some embodiments of the present invention, each batch in a set of batch encrypted data is of the same format (i.e., each batch contains the same number of data points and has the same "shape"). In some embodiments of the present invention, a shape of a batch is a visual approximation of a layout format of a plurality of data points contained in the batch.

In some embodiments of the present invention, a computer system/server receives a lookup key in a batch format. Alternatively, a computer system/server converts a lookup key to a batch lookup key. In some embodiments of the present invention, a computer system/server converts a lookup key to a batch lookup key by repeating a bit of the lookup key a sufficient number of times to form a single encrypted unit that matches a shape of a batch in a set of encrypted data. Alternatively, a computer system/server converts a lookup key to a batch lookup key by encrypting the lookup key in a single encryption.

Figure 6C:
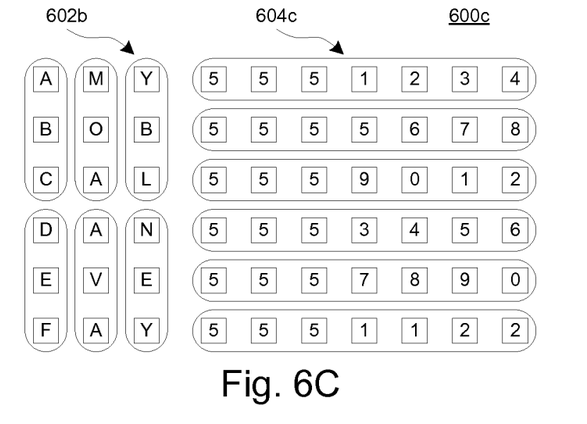
FIG. 6C depicts a second embodiment of a batch data environment according to the present invention.

FIG. 6C is a block diagram illustrating various portions of batch data environment 600c, including: set of batch contacts 602b; and set of batch phone numbers 604c. Batch data environment 600c contains the same sixty individual bits of data as are contained by batch data environment 600b. However, the manner in which set of batch phone numbers 604c is batched differs from the manner in which set of batch phone numbers 604b is batched. Here, each entry is batched in a single encryption, instead of an entry being split among a variety of encryptions. This difference in batching alters the format of intermediate and/or final results, but it does not significantly alter the manner in which a computer system/server achieves the intermediate and/or final results. In some embodiments of the present invention, a set of encrypted data and is encrypted as a set of individual bits. Set of batch phone numbers 604c is generally any second subset of a set of data that correlates to, is correlated to by, references, is referenced by, corresponds to, and/or is corresponded to by a first subset of a set of data. The label "set of phone numbers" is used only for ease of reference and is not intended to create any limitation on the type of data that block 604c represents.

FIG. 7A is a block diagram illustrating various portions of lookup result environment 700a, including: set of contacts 602a; lookup key 706a; intermediate lookup result value 708a; and lookup result 710a. In lookup result environment 700a, a computer system/server compares lookup key 706a against set of contacts 602a. In some embodiments of the present invention, a computer system/server performs a comparison in a format including, but not limited to: (i) a bitwise (or character-wise) comparison; (ii) an addition operation; and/or (iii) a modulo operation. In this example, a computer system/server uses a bitwise comparison; a comparison representing a match is depicted as a "1" in intermediate lookup result value 708a and a comparison representing a non-match is depicted as a "0" in intermediate lookup result value 708a. A computer system/server creates lookup result 710a by performing a multiplication operation on intermediate lookup result value 708a. In some embodiments of the present invention, a multiplication operation includes, but is not limited to: (i) multiplication of bits; (ii) use of a binary tree structure; and/or (iii) use of a modulo operation. In some embodiments of the present invention, a computer system/server omits creation of intermediate lookup result value 708a. In this example, a computer system/server uses a binary tree structure; an entry in set of contacts 602a matching lookup key 706a is represented as a "1" in lookup result 710a and an entry in set of contacts 602a not matching lookup key 706a is represented as a "0" in lookup result 710a.

In some embodiments of the present invention, a lookup key is encrypted before a computer system/server receives it. Alternatively, a computer system/server receives a plaintext lookup key and encrypts the lookup key. In some embodiments of the present invention, a lookup key identifies a type of information stored on computer system/server 12. In some embodiments of the present invention, a computer system/server receives a pointer or other reference indicator directing the computer system/server to the data within a set of encrypted data to search. In some embodiments of the present invention, a lookup key is encrypted as a set of individual bits. In some embodiments of the present invention, a computer server/system is unaware if a comparison between a lookup key and a set of encrypted data is successful. In some embodiments of the present invention, intermediate steps and results of intermediate steps involved in comparing a lookup key to a set of encrypted data remain encrypted. In some embodiments of the present invention, a lookup key matches a single piece of data in a set of encrypted data. Alternatively, a lookup key matches more than one piece of data in a set of encrypted data. In some embodiments of the present invention, a lookup result is a binary representation of whether a lookup key matched a corresponding data value in a set of encrypted data. In some embodiments of the present invention, a lookup key matches a plurality of contacts in a set of contacts.

In some embodiments of the present invention, a computer system/server only compares a lookup key against a first subset of a set of encrypted data. In some embodiments of the present invention, a computer system/server uses bitwise equality to compare a set of bits making up a lookup key against a set of bits making up a set of encrypted data. In some embodiments of the present invention, a computer system/server uses a character-wise equality to compare a lookup key against a set of encrypted data, wherein a character-wise equality is a comparison of native pieces of data from a lookup key against native pieces of data from a set of encrypted data. In some embodiments of the present invention, a computer system/server creates a lookup result by performing a multiplication operation on a set of resultant bits from a bitwise equality (sometimes called an intermediate lookup result value). In some alternative embodiments, a computer system/server uses a binary tree structure to create a lookup result by performing a multiplication operation on a set of resultant bits from a bitwise equality.

In some embodiments of the present invention, a computer system/server implements a binary tree structure to minimize degradation of an encryption and/or of any encrypted information. In some embodiments of the present invention, multiplying encrypted bits consumes more levels of an encryption than using a binary tree structure to perform a multiplication operation. In some embodiments of the present invention, an encryption contains 600 levels. In some embodiments of the present invention, multiplying encrypted bits consumes 30 levels of an encryption. In some embodiments of the present invention, a binary tree structure consumes levels of encryption based on a logarithmic scale (base two) for the number of bits being compared (e.g., binary tree comparison of a pair of four bit items results in a use of two levels; binary tree comparison of a pair of thirty-two bit items results in a use of five levels). In some embodiments of the present invention, degradation of an encryption is called noise. In some embodiments of the present invention, data contained within an encryption cannot be properly deciphered if the encryption degrades beyond a threshold level.

In some embodiments of the present invention, a computer system/server employs a modulus reduction to prevent or slow degradation in an encryption. In some embodiments of the present invention, a computer system/server employs modulus reduction a plurality of times on an encryption to prevent or slow degradation in an encryption. In some embodiments of the present invention, an encryption degrades beyond a threshold level and a computer system/server refreshes the encryption. In some embodiments of the present invention, refreshing an encryption is known as bootstrapping. In some embodiments of the present invention, bootstrapping allows a computer system/server to perform additional operations on an encryption before the encrypted data is unrecoverable. In some embodiments of the present invention, a computer system/server employs significant computational resources (e.g., money, time, and/or computing power) to perform bootstrapping.

FIG. 7B is a block diagram illustrating various portions of batch lookup result environment 700b, including: set of batch contacts 602b; lookup key 706a; batch lookup key 706b; batch intermediate lookup result value 708b; and batch lookup result 710b. In batch lookup result environment 700b, a computer system/server compares lookup key 706a against set of batch contacts 602b. To compare lookup key 706a against set of batch contacts 602b, a computer system/server converts lookup key 706a into batch lookup key 706b. In some embodiments of the present invention, a computer system/server implements a scalar representation of lookup key 706a to create batch lookup key 706b. In some embodiments of the present invention, batch lookup key 706b contains either: (i) repeated iterations of lookup key 706a; (ii) a replicated iteration of lookup key 706a such that only one instance of each datum of lookup key 706a exists, but is compared against multiple pieces of data in set of batch contacts 602b; and/or (iii) a stretched iteration of lookup key 706a such that only one instance of each datum of lookup key 706a exists, but is compared against multiple pieces of data in set of batch contacts 602b.

FIG. 8A is a block diagram illustrating various portions of lookup product environment 800a, including: set of phone numbers 604a; lookup result 710a; and lookup product 812a. In lookup product environment 800a, a computer system/server creates lookup product 812a by performing a multiplication operation on lookup result 710a (as a first factor) and set of phone numbers 604a (as a second factor). In some embodiments of the present invention, a multiplication operation includes, but is not limited to: (i) multiplication of bits; (ii) use of a binary tree structure; and/or (iii) use of a modulo operation.

In some embodiments of the present invention, a lookup product constitutes a large amount of data. In some embodiments of the present invention, a lookup product is larger in terms of storage size than a set of encrypted data. In some embodiments of the present invention, a computer system/server condenses a lookup product to reduce an amount of storage size used by the lookup product.

In some embodiments of the present invention, a computer system/server prevents against a likelihood of a lookup key matching a plurality of a set of contacts by pseudo-randomly sorting subsets of a lookup product to a set of bins. In some embodiments of the present invention, a computer system/server creates a final result by performing a separate addition operation on each bin in a set of bins.

In some embodiments of the present invention, a final result is a set of batches of data. In some embodiments of the present invention, a computer system/server creates a final result by performing an addition operation on a set of batches. In some embodiments of the present invention, before performing an addition operation on a set of batches a computer system/server combines a set of batches by altering a subset of the set of batches such that the set of batches is out of phase (e.g., no plurality of batches in the set of batches has a non-zero lookup product value in the same location). In some embodiments of the present invention, a computer system/server aligns a set of batches such that a computer system/server extracts and re-batches values stored in each batch in a different manner, without decrypting the data stored in the set of batches. In some embodiments of the present invention, a computer system/server performs extraction of data from a batch by implementation of a separate polynomial function encryption. In some embodiments of the present invention, a separate polynomial function encryption is a scalar polynomial. In some embodiments of the present invention, extraction of data from a batch includes, but is not limited to: (i) parallel extraction; (ii) bitwise extraction; and/or (iii) individual extraction of each piece of data. In some embodiments of the present invention, a computer system/server includes a pointer with a final result to indicate the start of the data in the final result.

Figure 8B:
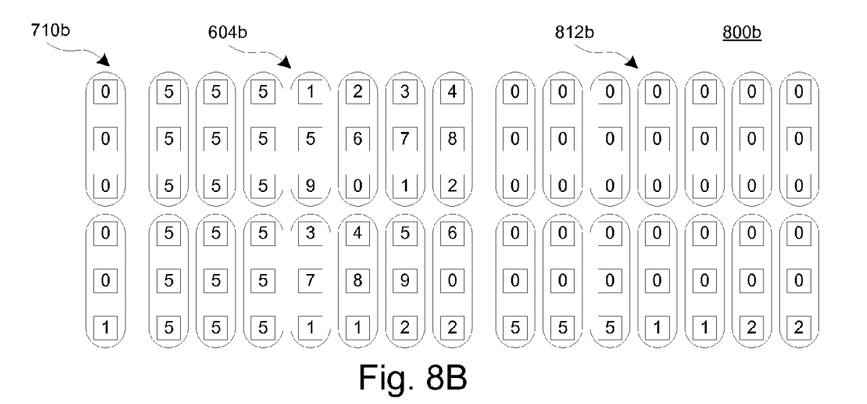
FIG. 8B depicts an embodiment of a batch lookup product environment according to the present invention.

FIG. 8B is a block diagram illustrating various portions of batch lookup product environment 800b, including: set of batch phone numbers 604b; batch lookup result 710b; and batch lookup product 812b. In batch lookup product environment 800b, a computer system/server creates batch lookup product 812b by performing a multiplication operation on batch lookup result 710b (as a first factor) and set of batch phone numbers 604b (as a second factor).

FIG. 9A is a block diagram illustrating various portions of final result environment 900a, including: lookup product 812a; and final result 914a. In final result environment 900a, a computer system/server creates final result 914a by performing an addition operation on lookup product 812a. In some embodiments of the present invention, an addition operation includes, but is not limited to: (i) addition of bits; and/or (ii) use of a modulo operation. In some embodiments of the present invention, the format of final result 914a mirrors the format of entries in set of phone numbers 604a. In some embodiments of the present invention, a computer system/server has the capability to determine the contents of final result 914a and/or set of phone numbers 604a if the format of final result 914a varies based on a varied lookup key 706a.

In some embodiments of the present invention, a computer system/server returns a lookup result and a set of phone numbers as a final result. In some embodiments of the present invention, a computer system/server returns a lookup product and a set of phone numbers as a final result.

Figure 9B:
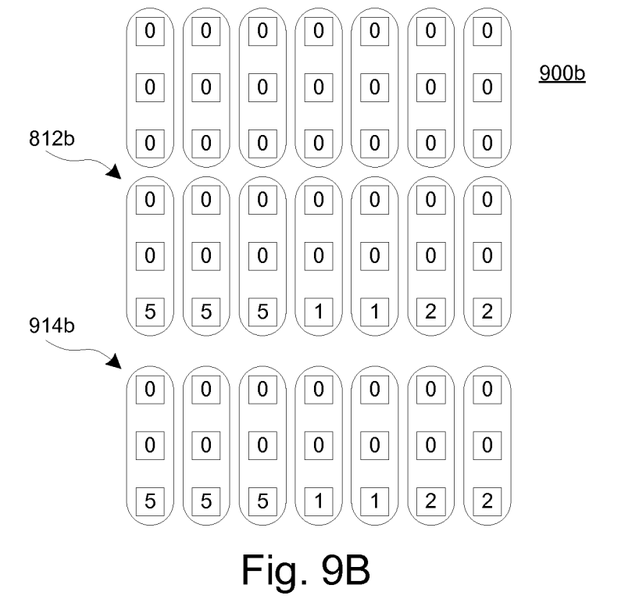
FIG. 9B depicts an embodiment of a batch final result environment according to the present invention.

FIG. 9B is a block diagram illustrating various portions of batch final result environment 900b, including: batch lookup product 812b; and batch final result 914b. In batch final result environment 900b, a computer system/server creates batch final result 914b by performing an addition operation on batch lookup product 812b.

Some embodiments of the present invention may include one, or more, of the following features, characteristics, and/or advantages: (i) operations performed on encrypted key-value data stores; (ii) encrypted queries performed against encoded (non-encrypted) data stores; (iii) results of encrypted queries remain encrypted; (iv) results of encrypted queries are only capable of being decrypted by a party issuing the query; (v) performing lookup operations in encrypted tables; and/or (vi) employing fully homomorphic encryption.

Some embodiments of the present invention may include one, or more, of the following features, characteristics, and/or advantages: (i) a set of encrypted data is received wherein the encryption is a polynomial function encryption; (ii) a set of encrypted data is stored as a table; (iii) a lookup key is received in a binary format; (iv) binomial storing allows for comparison using operations available under fully homomorphic encryption; and/or (v) a query is received in encoded and encrypted form.

Some embodiments of the present invention may include one, or more, of the following features, characteristics, and/or advantages: (i) a lookup key is compared against a set of encrypted data; (ii) a bitwise comparison is employed; (iii) homomorphic addition and modulo operations are employed on encrypted data; (iv) homomorphic multiplication is employed on encrypted data; and/or (v) a binary tree structure is employed on encrypted data.

Some embodiments of the present invention may include one, or more, of the following features, characteristics, and/or advantages: (i) batching is employed to encrypt, encipher, and/or encode multiple plaintext values in a single polynomial; (ii) processing of batches is faster than processing of individual pieces of data; (iii) batching improves resource efficiency because multiple operations are performed at once, (iv) batching employs "single instruction, multiple data" (SIMD) computation; and/or (v) batching is used to combine a subset of the entries from a table in a column-based or row-based format.

Some embodiments of the present invention perform a lookup operation on a data table in a fully homomorphic encryption system. In some embodiments of the present invention, a lookup operation includes: (i) assigning a set of table keys to a set of values in a data table; (ii) encoding, encrypting, and/or enciphering a set of digits of a set of values in a data table according to a polynomial function encryption method; (iii) encoding, encrypting, and/or enciphering a set of digits of a set of table keys according to a polynomial function encryption method; (iv) receiving a lookup key; (v) encoding, encrypting, and/or enciphering the lookup key according to a polynomial function encryption method; (vi) comparing a set of digits in a lookup key with a set of digits of a set of table keys to generate a set of equalities; (vii) finding a product of a set of equalities and a corresponding set of table keys using a corresponding homomorphic multiplication operator to produce a set of lookup results corresponding to a set of table keys; (viii) finding a set of products by using a homomorphic multiplication operation on a set of values in a data table and a corresponding set of lookup results; and/or (ix) summing a set of products together to retrieve a value corresponding to a lookup key.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:

1. A computer-implemented method comprising:
   receiving a lookup key from a user;
   comparing the lookup key to a first subset of a set of encrypted data using a bitwise equality to create a first result;
   performing a multiplication operation on the first result, as a first factor, and a second subset of the set of encrypted data, as a second factor, to create a lookup product;
   performing an addition operation on the lookup product to create a second result in a consolidated format; and
   returning to the second result to the user;
   wherein:
      the lookup key, the set of encrypted data, the first result, the lookup product, and the second result are encrypted using a fully homomorphic encryption.

2. The computer-implemented method of claim 1, wherein receiving a lookup key further includes:
   receiving an unencrypted lookup key;
   receiving a public encryption key; and
   encrypting the unencrypted lookup key based, at least in part, on the public encryption key;
   wherein:
      the public encryption key is related to the fully homomorphic encryption.

3. The computer-implemented method of claim 1, wherein the multiplication operation is a binary tree structure.

4. The computer-implemented method of claim 1, wherein the lookup key and the first subset of the set of encrypted data are in a binary format.

5. The computer-implemented method of claim 1, wherein the set of encrypted data is stored in a batched format.

6. The computer-implemented method of claim 1, wherein the set of encrypted data is stored on a cloud computing node.

7. The computer-implemented method of claim 1, wherein a first datum in the first subset of the set of encrypted data correlates to a second datum in the second subset of the set of encrypted data.

8. A computer program product comprising:
   a computer readable storage memory having stored thereon:
      first instructions executable by a device to cause the device to receive a lookup key from a user;
      second instructions executable by a device to cause the device to compare the lookup key to a first subset of a set of encrypted data using a bitwise equality to create a first result;
      third instructions executable by a device to cause the device to perform a multiplication operation on the first result, as a first factor, and a second subset of the set of encrypted data, as a second factor, to create a lookup product;
      fourth instructions executable by a device to cause the device to perform an addition operation on the lookup product to create a second result in a consolidated format; and
      fifth instructions executable by a device to cause the device to return the second result to the user;
      wherein:
         the lookup key, the set of encrypted data, the first result, the lookup product, and the second result are encrypted using a fully homomorphic encryption.

9. The computer program product of claim 8, wherein first instructions to receive a lookup key further includes:
   sixth instructions executable by a device to cause the device to receive an unencrypted lookup key;
   seventh instructions executable by a device to cause the device to receive a public encryption key; and
   eighth instructions executable by a device to cause the device to encrypt the unencrypted lookup key based, at least in part, on the public encryption key;
   wherein:
      the public encryption key is related to the fully homomorphic encryption.

10. The computer program product of claim 8, wherein the multiplication operation is a binary tree structure.

11. The computer program product of claim 8, wherein the lookup key and the first subset of the set of encrypted data are in a binary format.

12. The computer program product of claim 8, wherein the set of encrypted data is stored in a batched format.

13. The computer program product of claim 8, wherein the set of encrypted data is stored on a cloud computing node.

14. The computer program product of claim 8, wherein a first datum in the first subset of the set of encrypted data correlates to a second datum in the second subset of the set of encrypted data.

15. A computer system comprising:
a hardware processor set; and
a computer readable storage memory;
wherein:
the processor set is structured, located, connected, and/or programmed to run program instructions stored on the computer readable storage memory; and
the program instructions include:
first instructions executable by a device to cause the device to receive a lookup key from a user;
second instructions executable by a device to cause the device to compare the lookup key to a first subset of a set of encrypted data using a bitwise equality to create a first result;
third instructions executable by a device to cause the device to perform a multiplication operation on the first result, as a first factor, and a second subset of the set of encrypted data, as a second factor, to create a lookup product;
fourth instructions executable by a device to cause the device to perform an addition operation on the lookup product to create a second result in a consolidated format; and
fifth instructions executable by a device to cause the device to return the second result to the user;
wherein:
the lookup key, the set of encrypted data, the first result, the lookup product, and the second result are encrypted using a fully homomorphic encryption.

16. The computer system of claim 15, wherein first instructions to receive a lookup key further includes:
sixth instructions executable by a device to cause the device to receive an unencrypted lookup key;
seventh instructions executable by a device to cause the device to receive a public encryption key; and
eighth instructions executable by a device to cause the device to encrypt the unencrypted lookup key based, at least in part, on the public encryption key;
wherein:
the public encryption key is related to the fully homomorphic encryption.

17. The computer system of claim 15, wherein the multiplication operation is a binary tree structure.

18. The computer system of claim 15, wherein the lookup key and the first subset of the set of encrypted data are in a binary format.

19. The computer system of claim 15, wherein the set of encrypted data is stored in a batched format.

20. The computer system of claim 15, wherein the set of encrypted data is stored on a cloud computing node.

* * * * *